United States Patent [19]
Hare et al.

[11] Patent Number: 6,084,638
[45] Date of Patent: *Jul. 4, 2000

[54] COMPUTER INTERFACE EXTENSION SYSTEM AND METHOD

[76] Inventors: Charles S. Hare, 8 Glenn Pl., Whippany, N.J. 07981; Brent W. Blythe, II, 166 Serpentine Rd., Tenafly, N.J. 07670; Dursun Sakarya, 10 E. Blackwell, Dover, N.J. 70801

[*] Notice: This patent issued on a continued prosecution application filed under 37 CFR 1.53(d), and is subject to the twenty year patent term provisions of 35 U.S.C. 154(a)(2).

[21] Appl. No.: 08/725,940

[22] Filed: Oct. 8, 1996

[51] Int. Cl.$^7$ ........................................ H04N 7/18
[52] U.S. Cl. ............................ 348/552; 348/734
[58] Field of Search .................... 348/552, 441, 348/6, 13, 734, 906, 12; H04N 7/18

[56] References Cited

U.S. PATENT DOCUMENTS

| | | |
|---|---|---|
| D. 288,434 | 2/1987 | Gemmell . |
| 3,569,617 | 3/1971 | Allen et al. ........................... 348/552 |
| 3,618,035 | 11/1971 | Simms, Jr. ............................. 348/14 |

(List continued on next page.)

FOREIGN PATENT DOCUMENTS

| | | |
|---|---|---|
| 6282374 | 10/1994 | Japan . |
| 254546 | 8/1995 | Taiwan . |
| 270567 | 2/1996 | Taiwan . |
| WO 98/34377 | 8/1998 | WIPO . |
| WO 98/34378 | 8/1998 | WIPO . |

OTHER PUBLICATIONS

Y–Key Key Dual Keyboard Adapter by P.I. Engineering, Inc. (brochure), 1996.

RemotePoint Plus by Interlink Electronics (User's Guide), 1995.

Wavecom and Wavecom Jr. by RF Link Technology Inc. (Owner's Manual), 1995.

MaxStation Hardware and Software Reference by Maxspeed Corporation (User's Guide), 1996.

Welland Industrial Co., Ltd, Parallel & Bi–Tronics & Serial Auto Data Switch (Product Publ.—4 pages). date unknown.

Gateway 2000, Gateway 2000 Destination, 1996 Gateway 2000, Inc. (Product Publ.—2 pages).

Alen International Co., Ltd., 2/4/6 Ports CPU Switch, (Product Publ.—2 pgs.). date unknown.

Thomson Consumer Electronics, Series of Entertainment, Educational Products to Emerge From New RCA Brand Internet Access Device, Official Says, (Product Publ.—2 pgs.). date unknown.

(List continued on next page.)

*Primary Examiner*—Howard Britton
*Attorney, Agent, or Firm*—Amster, Rothstein & Ebenstein

[57] ABSTRACT

A system is disclosed which permits the user interface of a PC to be extended to the location of a remote television (TV) receiver such that video and audio signals generated by the PC may be viewed and heard on the remote TV receiver, and users at the TV receiver may control the operations of the PC through input devices located at the TV receiver. Through the disclosed interface extension system, video signals and accompanying audio signals, if any, generated by the PC are transmitted locally to a receiver coupled to the remote TV receiver. In a further embodiment, the interface extension system is used to provide multiple simultaneous interactive sessions to more than one user under the independent control of individual users located at each of several video displays, e.g. TV receivers. In that embodiment, data received from input devices located at each video display is tagged to identify the session on the PC which is controlled thereby. The disclosed interface extension system may include a multiple instruction program for providing macro-level control over the operations of the PC from the TV receiver location. In still another embodiment, the interface extension system can be used in conjunction with TV signal processing circuitry to provide related data signals accessed by the PC for display upon a television receiver in conjunction with a television signal which contains an embedded address through which the related data is accessed.

22 Claims, 6 Drawing Sheets

U.S. PATENT DOCUMENTS

| | | |
|---|---|---|
| 3,812,488 | 5/1974 | Yoshino et al. ............... 364/710.14 |
| 3,961,324 | 6/1976 | Cousin et al. ............... 345/1 |
| 4,628,446 | 12/1986 | Hoffner, II ............... 395/886 |
| 4,800,423 | 1/1989 | Appiano et al. . |
| 4,833,596 | 5/1989 | Buckland et al. ............... 395/834 |
| 4,866,515 | 9/1989 | Tagawa et al. ............... 348/8 |
| 4,928,168 | 5/1990 | Iwashita ............... 348/3 |
| 5,062,059 | 10/1991 | Youngblood et al. ............... 395/200.47 |
| 5,111,296 | 5/1992 | Duffield et al. . |
| 5,113,259 | 5/1992 | Romesbury et al. . |
| 5,129,077 | 7/1992 | Hillis ............... 395/500 |
| 5,181,107 | 1/1993 | Rhoades ............... 348/13 |
| 5,226,177 | 7/1993 | Nickerson ............... 348/13 |
| 5,241,389 | 8/1993 | Bilbrey ............... 348/552 |
| 5,251,301 | 10/1993 | Cook ............... 348/552 |
| 5,283,819 | 2/1994 | Glick et al. . |
| 5,327,554 | 7/1994 | Palazzi, III et al. ............... 348/13 |
| 5,347,304 | 9/1994 | Moura et al. ............... 348/12 |
| 5,355,480 | 10/1994 | Smith et al. ............... 345/348 |
| 5,396,546 | 3/1995 | Remillard ............... 379/93.24 |
| 5,404,393 | 4/1995 | Remillard ............... 379/93.25 |
| 5,414,773 | 5/1995 | Hendelman . |
| 5,461,667 | 10/1995 | Remillard ............... 379/93.24 |
| 5,481,296 | 1/1996 | Cragun et al. ............... 348/13 |
| 5,488,412 | 1/1996 | Majeti et al. ............... 348/10 |
| 5,502,503 | 3/1996 | Koz . |
| 5,512,935 | 4/1996 | Majeti et al. . |
| 5,561,709 | 10/1996 | Remillard ............... 379/96 |
| 5,594,509 | 1/1997 | Florin ............... 348/731 |
| 5,608,446 | 3/1997 | Carr ............... 348/13 |
| 5,617,565 | 4/1997 | Augenbraun ............... 707/4 |
| 5,675,390 | 10/1997 | Schindler ............... 348/725 |
| 5,774,664 | 6/1998 | Hidary ............... 348/12 |
| 5,790,201 | 8/1998 | Antos . |
| 5,850,340 | 12/1998 | York ............... 364/188 |

OTHER PUBLICATIONS

Boot Reviews, NetTV World Vision: An advance look, Boot Preview Issue pp. 24 & 25 (Product Publ.—2 pgs.). dates unknown.

Video Test, Net Gain, Ken C. Pohlmann & Michael Antonoff, pp. 66–68 & 70, (Product Publ.—4 pgs.). date unknown.

Sony, INT–W100 Internet Terminal, (Product Publ.—4 pgs.). date unknown.

Quality Value Service, Computer Accessories Product Catalog, p. 20 (Product Publ.—1 pg.). date unknown.

GWC Technology Inc., Keyboard Extender & PC Sharing Box Kit, pp. 38–39 (Product Publ. 2 pgs.). date unknown.

A World Of Opportunities, Mitsubishi The Big Sceen, p. 5 (Product Publication—1 pg.). date unknown.

Hill et al, "When a TV Joins a PC, Will Anybody Be Watching?", Wall Street Journal, Apr. 3, 1996, 3 pages.

"Accelerated Multi–Screen Video Adapters", (advertisement) *PC Today* Jun., 1996, p. 57.

MVP–X Series Multi–Monitor Solutions, STB Systems Inc. published on or before Jul., 1996.

"Easy PC–To–TV Converter, The AverKey5", (advertisement) published on or before Jul., 1996.

"Computer Presentations On Any TV!" (advertisement) published on or before Jul., 1996.

"TV Elite Pro With Remote!" (advertisement) published on or before Jul., 1996.

Elcom Technologies Corporation (promotional brochure) distributed on or before Jul., 1996.

"exTV™ Product Functional Description", (promotion literature) distributed on or before Jul., 1996 by Elcom Technologies Corp.

"Homework, Drafting A Consumer Network", *OEM Magazine*, Apr., 1996, p. 23.

FIG. 1b  HEAD END UNIT W/ F.A.M./COMBINER

SINGLE POINT TO POINT RECEIVER AND/OR HUB BUILT IN TV

SINGLE POINT TO POINT RECEIVER BUILT IN TV W/ EXT. HUB

SINGLE POINT TO POINT EXTERNAL RECEIVER

DISTRIBUTED

COMPUTER INTERFACE EXTENSION SYSTEM AND METHOD

FIELD OF THE INVENTION

The present invention relates to an input-output system for a computer and more specifically to an interface extension system which permits a PC to be utilized and controlled from the location of a television receiver.

BACKGROUND OF THE INVENTION

Moderately priced general purpose micro-computers, i.e. PCs, have recently moved beyond their erstwhile roles as home financial and educational tools to become sophisticated multimedia entertainment systems and, with increasingly available Internet access, are poised to become an important forum for the direct home marketing of goods and services. In addition, games designed to be executed on PCs are rapidly overtaking games designed for specific game consoles such as Nintendo® and Sega Genesis®. These recent developments are influencing many people to install a computing base in their primary entertainment room, e.g. a living room or family room.

Both the PC and the television industry have responded to these developments by offering living room computing systems. The offerings by the PC industry reflect desire on the part of PC manufacturers to make inroads into the traditional domain of television makers. One such recently introduced PC system is the Destination® system offered by Gateway 2000, Inc. The Destination system is a high resolution, large screen PC which is optimized for use in locations where a TV receiver has traditionally been used. The Destination system incorporates a "high end," albeit conventional, PC having a high performance microprocessor, CD-ROM drive, sound and video processing cards, and disc storage drives and is equipped with a wireless pointing device (mouse) and an available wireless keyboard. In addition, the large screen monitor of the Destination system displays images at higher resolution than conventional large screen TV displays. Having these features, the Destination system permits users to operate a full function PC system and to browse Internet sites (i.e., to "websurf") from a sofa located within viewing range of the large screen PC system. In addition to the Destination system, the 'Genius' system offered by Thomson Electronics has a similar construction and need not be described in further detail here.

Another recently developed PC system is the 'Simply Interactive PC' (TM) reference specification adopted and advanced by Microsoft, Inc. for combination PC—television systems. Under that Specification, the PC generates a video display signal and converts it to a television scan format such as NTSC, to permit the display signal to be viewed on a television receiver. The Specification provides minimal standards for processor and memory capacity, but requires the system to include a modem and network protocol support to provide a basic Internet browsing function. Finally, the Specification requires the PC to have 'instant on' operation; that is, the PC must appear to have no boot cycle from the viewpoint of the user when it is turned on.

The foregoing described Gateway Destination and Thomson Genius systems share a common disadvantage in that each of those systems is marketed as a high end (and consequently expensive) PC system to be used primarily in places (e.g. the living room or family room) where a less expensive TV receiver has traditionally been used. In the past, TV receivers and PCs have been used in the living room or family room primarily for children's oriented activities such as game-playing. Activities requiring greater concentration such as home financial management and word processing have traditionally been performed on a PC located away from the living room in a bedroom or home office. Since both up-to-date game applications and popular finance and word processing applications require relatively high end PC systems, users who wish to benefit from such applications must keep current by purchasing relatively high end PCs. Finally, since there is no reason to expect that users will choose to conduct all computing activities from a PC located in their living rooms, the new Destination and Genius systems would require a family to purchase two relatively high end systems in order to perform the full range of their traditional home computing activities. For these reasons, the new living room based PCs result in substantial added costs which ultimately limit their attractiveness.

The currently available alternative is also undesirable. Although systems which conform to the Simply Interactive PC specification reduce the cost of living room based computing, such systems represent substantial compromises in PC functionality and performance. There remains an unsatisfied need for a system which reduces the cost of PC computing performed in the living room without reducing the operational capabilities of such computing The present invention fills this need by extending the user interface of a PC located in one location (such as a home office) to another location where a television (TV) receiver is located. The present invention extends the user interface by converting the PC generated video display signal to a scan format which can be displayed on the TV receiver and transmitting the video display signal and/or PC generated audio signals from the PC location to the TV receiver location. The interface extender system also incorporates a device located at the TV receiver which receives user command and pointing device input data and couples that input data to the PC via an available radio frequency transmission channel which may be wireless or utilize existing wiring such as the AC wiring within a house.

The present invention is not without its antecedents. U.S. Pat. No. 3,618,035 shows a system in which the output of a computer 150 (FIG. 1) is connected to a data translator and synchronizer 134 such that video signals are transmitted via a switching system 130 to a "standard video-telephone station" (e.g., subscriber station 100a) having a video display screen 112. A subscriber located at the video-telephone station uses a light pen 122 to transmit control signals to the computer 150 and thereby control what he sees on the display.

U.S. Pat. No. 3,569,617 shows a system in which a time-sharing computer 10 (FIG. 1) is coupled via a data interpreter 20 to a scan converter 31 which in turn is coupled to a video signal distributor 32 which records video output signals corresponding to respective users' time-shares on a video disk 33. Information stored on video disk 33 is then transmitted to a plurality of conventional television receivers 60 for viewing by each user. As in U.S. Pat. No. 3,618,035, described above, users located at the television receivers use a light pen 40 to interact with the displayed video and transmit control signals back to the computer 10.

The systems taught in the above-described '035 and '617 Patents, while permitting user input to be transmitted to the computer from the location of a remote computer, fall short of extending the user interface of a computer system, especially a PC, in substantially unaltered condition to permit a user at a TV receiver to effect substantially the same level of control over the PC as when the user is at the PC location.

Accordingly, it is an object of the present invention to extend the user interface of a PC from the location of said PC to the location of a television (TV) receiver remote from said PC.

It is another object of the invention to provide a system which couples command and pointing device input data generated at a remote video display (e.g. TV receiver) location to a PC in an input format recognized by the PC.

A further object of the invention is to provide control over the operations of a PC from the location of a remote TV receiver by transmitting PC recognized input data over a wireless transmission medium or over available parallel conductor or twisted pair conductor transmission lines.

Still another object of the invention is to provide a low cost and easily managed transmission channel for transmitting a full motion PC display and PC generated audio signals from the PC to the remote location of a TV.

Still another object of the invention is to provide utilization of and control over a PC from a remote location by launching a multiple instruction program from the remote location which provides macro-level control over PC.

Another object of the invention is to provide a system which multiplies the user interface of a PC to provide multiple simultaneous interactive sessions on such PC which are controlled independently by users located at each of a plurality of video displays.

Still another object of the invention is to permit a television transmission to be viewed in conjunction with related PC generated display and/or audio signals by extracting an embedded address from the TV transmission and accessing related data through the extracted address for generating the related display and/or audio signal by the PC.

SUMMARY OF THE INVENTION

These and other objects are provided by the computer interface extension system and method of the present invention. In accordance with the present invention, a system is provided which extends the user interface of a PC from the location of the PC to the location of a television (TV) receiver at a remote location.

A computer user interface, especially a PC user interface, is defined by a video display and/or one or more audio signals which vary in response to user input received and recognized by the computer. As used herein the term "video display" includes an associated audio presentation, as for example available from a multi-media computer. While a great variety of signalling methods have been used in the past (e.g. light-pen and punched card) for providing user input to various computing systems, virtually all computers purchased by individuals today for home use are PCs which accept digitally encoded input data from keyboards and pointing devices. Recent advances in PC technology provide new methods for the PC to acquire input data. These include facsimile transmission, sound acquisition through sound cards, image acquisition through digitizing video camera systems and document scanners, and systems which optically recognize scanned document character input or voice commands. While all such signalling methods permit some level of control to be asserted over a computer, the primary and preferred signalling methods at present and for the foreseeable future are those which cause the location of a pointer to move relative to a PC generated video display (e.g. a mouse) or through which the user can select characters to appear upon the video display (e.g. a keyboard). The present invention seeks to permit these primary signalling methods to be used at locations more distant from the PC than existing PCs permit. In addition, the present invention provides a system by which other non-primary signalling methods (e.g. video camera signals) can be transmitted and coupled to the PC from the remote location.

Accordingly, the computer interface extension system according to an embodiment of the present invention incorporates a scan converter for converting the PC video display signal from a PC scan format to a TV scan format to permit the PC video display to be received and viewed on the TV receiver. A transmitter is also incorporated which transmits a signal representing a PC video display and PC generated audio signals, if any, from the location of the PC to the location of a remote TV receiver. In addition, the interface extension system includes an input interface extender which is used to couple user input generated at the TV receiver location, including command input and/or pointing device input, to a PC in a format recognized by the PC.

With the interface extension system of the present invention, all PC operations which do not require the manual interchange of storage media can be initiated and controlled from the location of the TV receiver through user input provided to the input interface extender, thus permitting the remotely located PC to be fully utilized at the TV receiver location.

Data and video display information interchange is accomplished by the present invention in the following manner. Preferably, in order to conserve system bandwidth, the PC scan format display signal is converted through a scan converter located at the PC and then transmitted as a conventional television signal (e.g. NTSC format) from the PC location to the location of the TV receiver. Alternatively, when system bandwith considerations are less important, the scan converter can be located at the TV receiver location such that the PC video display signal is transmitted in an available PC scan format to the TV receiver location and then converted to a TV scan format for viewing on the TV receiver. Preferably, in a first embodiment, the PC video display signal is transmitted from the PC location to the TV receiver location as a modulated radio frequency or microwave wave signal over the air. In another preferred embodiment, the PC video display signal is transmitted from the PC location to a head end location of a radio frequency transmission line such as a coaxial cable, which couples the transmitted signal to the TV receiver. Preferably, when transmitted to such head end location, the PC video display signal is converted to the TV scan format prior to transmission. While the converted display signal and any accompanying audio signals are preferably transmitted over the air from the PC location to the head end location, such signals might also be transmitted via a radio frequency transmission line from the PC location to the head end location.

Another embodiment of the present invention permits the user interface of a PC to be multiplied so as to provide multiple simultaneous independently controlled interactive sessions providing video and accompanying audio signals, when present, to users located at each of a plurality of video displays (e.g. TV receivers). In this embodiment, input interface extenders are located at each of the video displays. In order to permit the input data generated by the input interface extenders to control only selected ones of the interactive sessions, each input interface extender tags the input data it generates with a unique identifier.

In another embodiment of the invention, the input interface extender incorporates at least one multiple instruction program for providing macro-level control over the operations of the PC. Preferably, the multiple instruction program controls the PC operations without regard to the application being executed on the PC, and preferably irrespective of the architecture of the micro-processor or operating system elements of the PC. In a highly preferred embodiment, the program included in the input interface extender is structured to re-configure the PC video display to provide improved viewing on the TV receiver. Such program may be launched for execution on the PC by a "run" button or other simple input device at the TV receiver location.

Finally, in still another embodiment of the invention, a system is provided which permits a television transmission to be viewed in association with a related PC generated display signal and accompanying audio signals, if any, on a TV receiver remote from the PC. In this embodiment, an embedded address is extracted from the television transmission, at which address data related to the television transmission can be accessed by the PC. The system includes an activating device (e.g. a pushbutton switch) which responds to user input at the TV receiver to prompt the PC to access the related data using the extracted address. The system provides the related data as a displayable signal and accompanying audio signal, if any, to the TV by generating a display signal and any accompanying audio signals at the PC location, converting the video display signal from a PC scan format to a TV scan format, and locally transmitting the display signal and any accompanying audio signals from the PC location to the TV receiver. Preferably, the related PC generated display signal is provided on the TV receiver in a picture-in-picture display format. Preferably, the system also provides a way of rapidly, directly, and automatically switching the TV receiver display between the transmitted television signal and the related PC display signal. Preferably, the system also provides positive indication to the viewer when an embedded address is available for extraction from the television transmission, and also indicates when the PC receives such related data to be displayed.

BRIEF DESCRIPTIONS OF THE DRAWINGS

FIG. 1b is a block diagram illustrating the construction of a head end unit portion of the computer interface extension system.

DETAILED DESCRIPTION OF THE PREFERRED EMBODIMENTS

Figure 1:
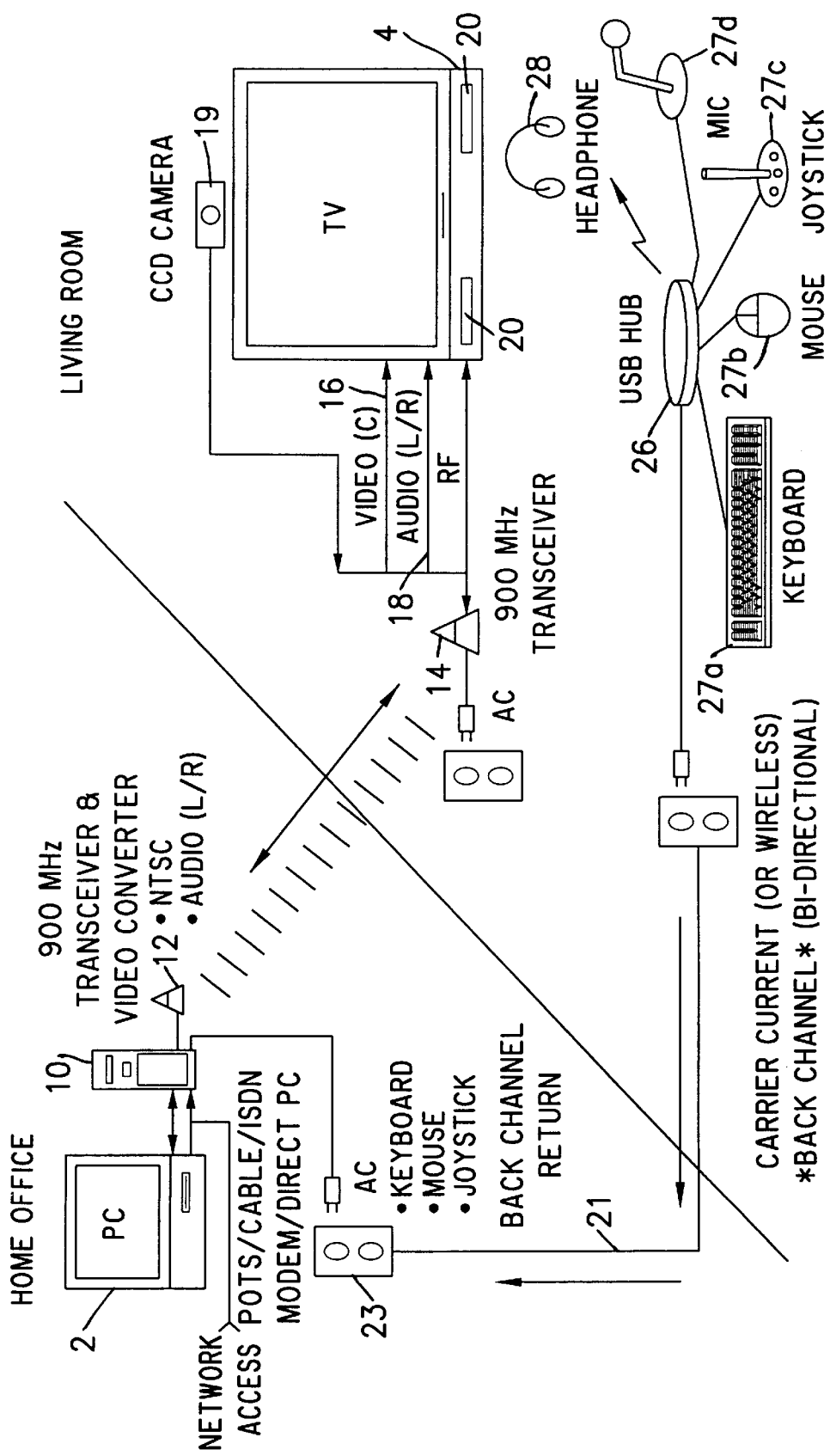
FIG. 1 is a block diagram showing the general construction and interaction between components of the computer interface extension system of the present invention.

FIG. 1 shows the construction of a first embodiment of the computer interface extension system of the present invention and the general interconnection of the invention with a PC and a conventional TV receiver.

In the exemplary embodiment shown in FIG. 1, the invention is embodied in a PC interface unit 10 which incorporates a video scan format converter and a transceiver 12 coupled to the PC for transmitting the PC video display signal (including audio) to the location of the TV receiver via radio frequency or microwave frequency.

In the embodiment shown in FIG. 1, the video scan format converter (shown in more detail in FIG. 1a) converts the scan format of the PC video display signal from that generated by the PC to a scan format suitable for displaying upon the TV receiver indicated by reference numeral 4. Left and right audio channel data are also provided from PC 2 through PC interface unit 10 to transceiver 12 to be transmitted via radio frequency or microwave frequency to a corresponding transceiver 14 located at the TV receiver 4.

Transceiver 14 receives and demodulates the transmitted PC video and audio channel signals and outputs a composite video signal 16 and left and right audio channel signals 18 to TV receiver 4. Alternatively, transceiver 14 provides a radio frequency (RF) input to TV receiver 4 which contains the composite video signal and the left and right audio channels signals. Using the thus received audio and video channel signals, the TV receiver 4 displays the PC generated video in a compatible TV scan format and processes the received left and right audio channel signals for output to speakers 20 which may be integrated into the TV receiver 4 or connected thereto.

As shown in FIG. 1 the interface extension system incorporates a 'backchannel' 21 for transmitting input data received at the location of the TV receiver to the location of the PC interface unit 10. Modulated input data received at the location of the TV receiver is transmitted on backchannel 21 along an available transmission medium such as wireless radio frequency transmission or tranmission via the AC wiring which extends between the location of the PC 2 and the TV receiver 4. Those skilled in the art will understand that several different transmission media are available which are suitable for locally transmitting data within a limited area, which include media relying on electromagnetic radiation such as wireless radio frequency, microwave, and infrared transmission, as well as guided transmission media which utilize either dedicated or multi-use transmission lines (e.g. parallel conductor, twisted pair and coaxial cable lines) and/or optical fiber lines. Transceivers 22 and 12 (FIGS. 1a and 1c incorporated into the interface extension system or operating in conjunction therewith, are designed to transmit information through the available transmission medium, e.g. wireless radio frequency transmission. When the transmission medium is current carrying AC wiring, transceivers 22 and 12 are implemented as modems which operate, for example, according to a known standard such as CEBus.

User input is received from the location of the TV receiver 4 through a input interface extender 26, shown, for example, as a Universal Serial Bus (USB) standard hub. The Universal Serial Bus is a recently introduced system standard which permits input data from typical input devices such as a keyboards, mice, joysticks, as well as more recently introduced input devices, e.g. microphones, to be transmitted along a single serial transmission line into a USB input port of the PC. The USE Standard permits devices having USB output interfaces to connect to a USB transmission line by simply connecting the output lines of the devices to either a USB transmission line or to the output line of any other USB compatible device which is connected to the USB input port of the PC. In addition, the USB Standard provides for USB hubs which control USB traffic in two directions along USB transmission lines. Thus, the input interface extender 26, when implemented with a USB hub device receives keyboard, mouse, joystick, and microphone input data and transmits that data as multiplexed serialized packet data through transmitter 22 along backchannel 21 through receiver 12 to PC interface unit 10 connected to PC 2. The input interface extender 26 further identifies and receives serialized data incoming from backchannel 21 for use at the user location, e.g. audio channel data for output via wireless infrared link to IR headphone 28.

It will be appreciated that the USB transmission protocol is an open standard which permits new input device systems to be added as they become available. Thus, retinal tracking devices and electronic gloves such as those used in virtual reality applications are among the many different types of input devices which could be used with the present invention. Such input devices may have standard, hardwired serial or parallel data interfaces, or may belong to a newer class of input devices which allow short range wireless data transmission and may operate according to traditional standards e.g. PS/2®, RS-232 or the more recent USB standard.

Figure 1A:
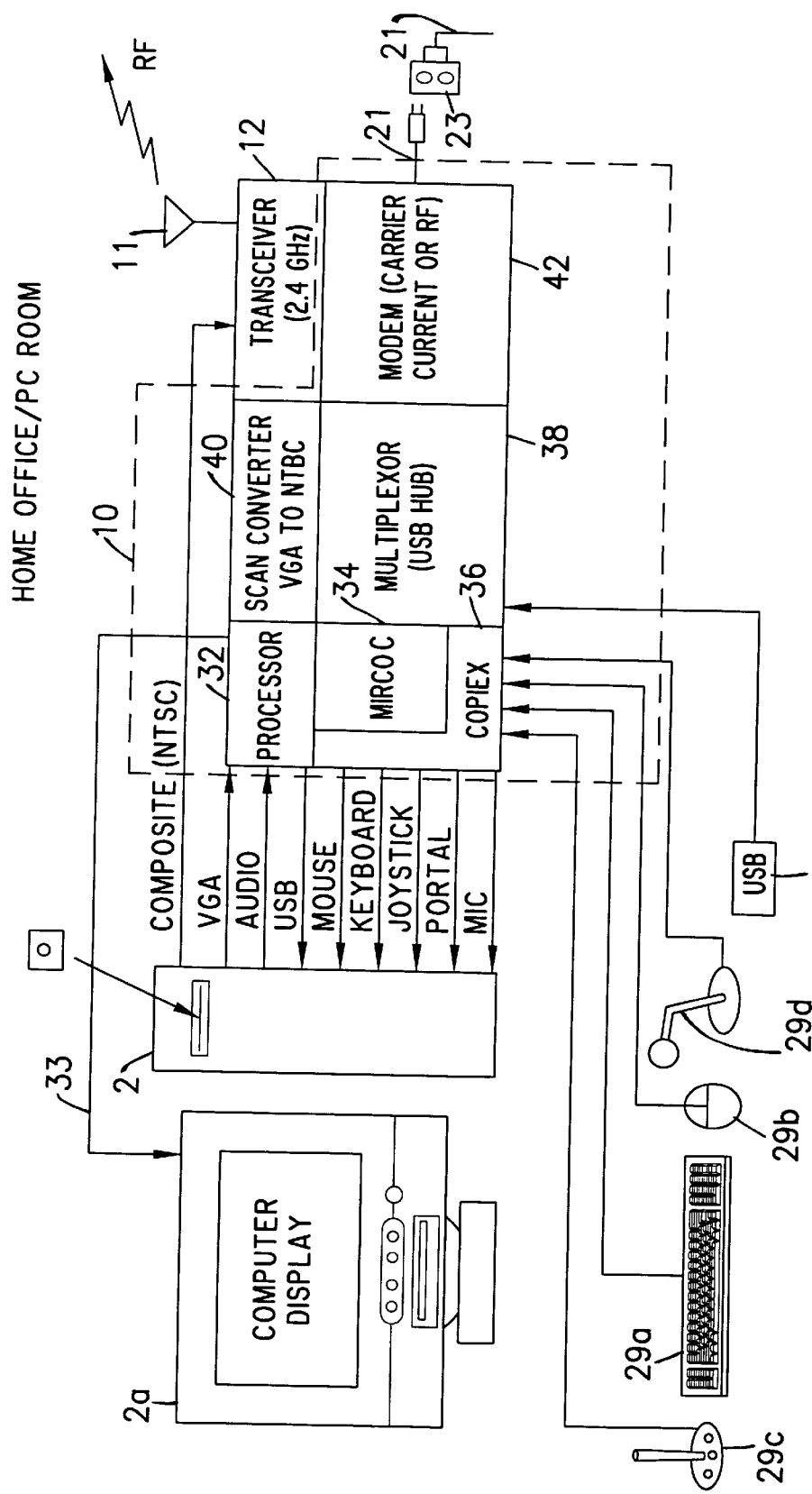
FIG. 1a is a block diagram illustrating the construction of a PC interface unit portion of the computer interface extension system.

FIG. 1a is a block diagram showing the construction of a PC interface unit 10 portion of the computer interface extension system, for use at the location of the PC. As shown in FIG. 1a, PC interface unit 10 is coupled to PC 2 through interface lines as follows: "VGA" through which PC video display output is received; and "Audio" through which PC audio output is received. Input is provided to the PC through signal interfaces "USB", "Mouse", "Keyboard", "Joystick", "Serial" and "Mic" as multiplexed data from respective input devices including joystick 29c and joystick 27c (FIG. 1c), keyboard 29a and keyboard 27a (FIG. 1a), mouse 29b and mouse 27b, microphone 29d and microphone 27d, and any USB device which is directly connected into USB transmission line 30.

PC interface unit 10 incorporates the following elements. Processor 32 is used to receive VGA video output from the PC and distribute that signal in original form to a video display 2a. Processor 32 is also used to distribute PC audio signals in original form to a pair of speakers (not shown) for output at the PC thereon. PC interface unit 10 also incorporates a microcontroller 34 which is used to guide the flow of incoming signals from input devices 29a–29d to PC 2 in conjunction with multiplexed serial data arriving through a backchannel 21, or through USB transmission line 30. Coplexor unit 36, is designed to multiplex two signals from each type of input device, e.g. joystick 27c, located at the TV receiver location, and joystick 29c, located at the PC location, onto a single standard input interface, e.g. "Joystick" interface shown at the input to PC 2. Coplexor 36 permits the interface extension system of the present invention to be used with existing PCs and input devices which do not incorporate USB standard interfaces. As contemplated in the present invention, coplexor 36 would incorporate a plurality of standard PC interface connections for receiving input from existing PC input devices, i.e. those indicated by reference numerals 29a through 29d.

PC interface unit 10 also incorporates a USB hub 16 for multiplexing USB data received at the PC location, e.g. through USB transmission line 30, and as received from the TV receiver location, i.e. through backchannel 21. Finally, PC interface unit 10 incorporates a scan converter 40 for converting the PC video display signal from the PC scan format, e.g. from VGA or SVGA format to a television scan format, e.g. NTSC.

Coupled to the output of PC interface unit 10 is a transceiver 12 used to modulate and transmit the converted PC video display signal via radio frequency or microwave frequency over the air from the PC location to the TV receiver location.

FIG. 1b is a block diagram illustrating the construction of a head end unit portion 50 of the computer interface extension system. Referring to FIG. 1b, head end unit 50 is used at the head end of a local (e.g. household) cable distribution system to couple video signals generated and transmitted from the PC onto the local cable system for distribution to different rooms or areas as within a house. The head end unit 50 would ordinarily be located in a basement or a garage where the incoming cable is distributed to different rooms. As shown in FIG. 1b, head end unit 50 includes an antenna 52 for receiving a transmitted radio frequency or microwave frequency signal from the PC location, which signal contains video and audio signal information generated by the PC. Those skilled in the art will appreciate that a number of alternatives exist for transmitting the signal from the PC location to the head end unit, among which are various hardwired methods including radio frequency transmission on a separate coaxial cable from the PC location to the head end unit 50.

Head end unit 50 includes a receiver 54 for detecting and receiving the transmitted video and audio signals from the PC. The receiver 54 is coupled to a converter 56 which converts the received signal from the transmitted frequency to a frequency selected by a frequency agile modulator 58 and described in the following. Head end unit 50 also includes a frequency agile modulator (FAM) 58. The FAM 58 is used to locate available, i.e., unused, frequencies on the incoming CATV cable and to modulate signals, i.e. PC video and audio signals received by receiver 54, onto one or more of those otherwise unused channels to permit the FAM modulated signals to be combined with the existing signals on the cable system through a combiner 60 on to a single cable 61 for local distribution, for example, within a house. Head end unit 50 additionally incorporates a combiner 60 which combines the modulated signal output of FAM 58 with the available cable channel signals from incoming cable 62 onto one or more cables 61 used for local distribution. Head end unit 50 also incorporates a transceiver unit 63 used to receive backchannel data from input devices located at one or more receivers and to transmit such data on an available transmission medium, e.g. via wireless radio frequency transmission, or via the AC wiring of a house, to a PC 2.

Figure 1C:
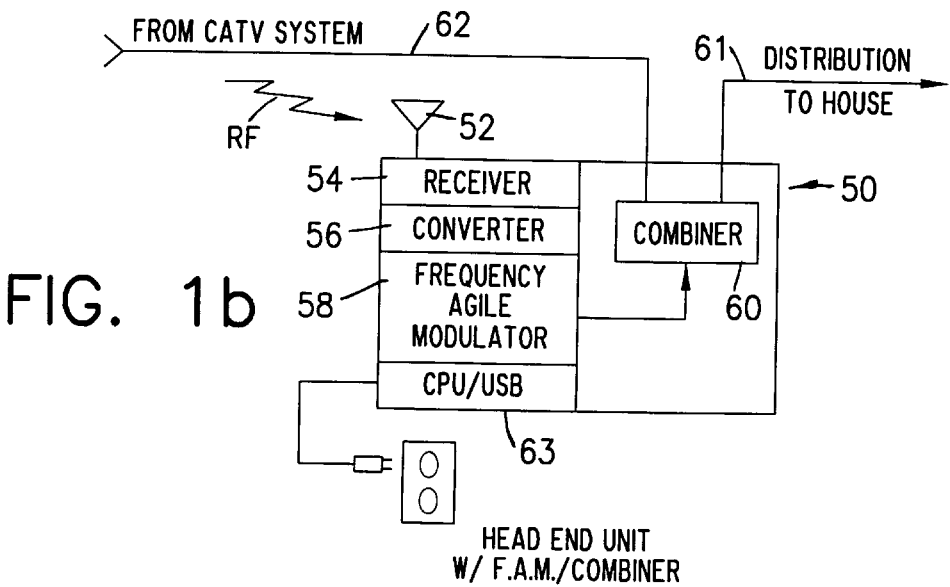
FIG. 1c is a block diagram illustrating the construction of transceiver and input interface extender components of the computer interface extension system.
Figure 1C:
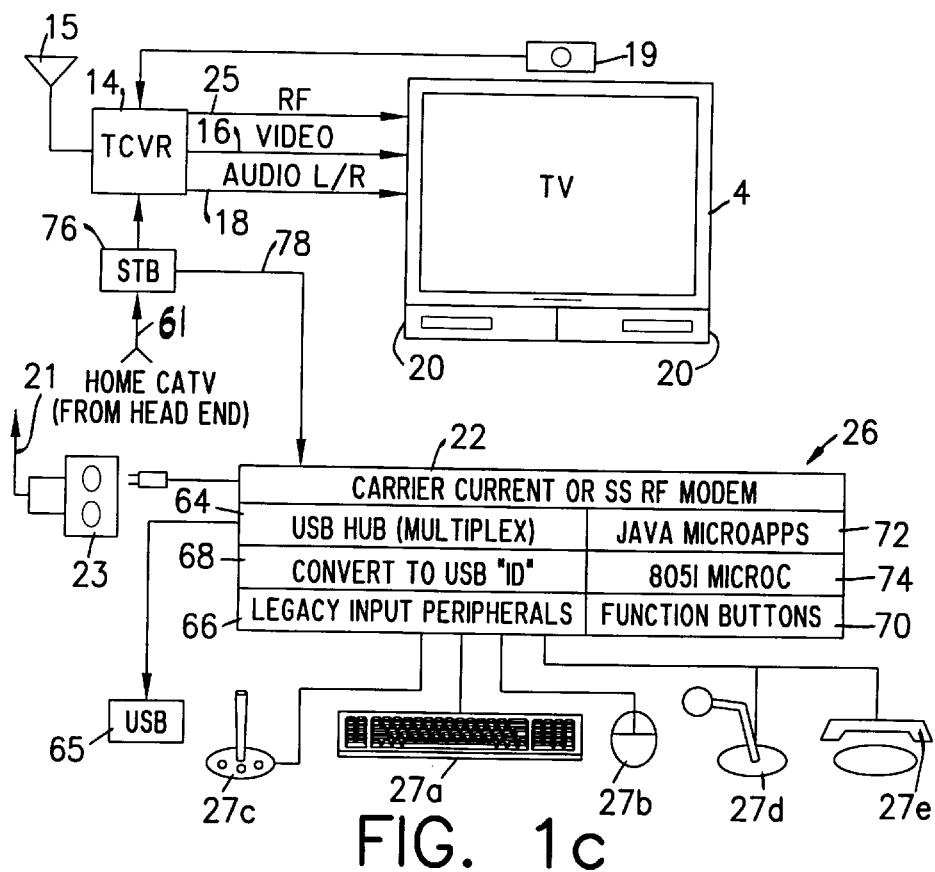

Referring to FIG. 1c, the portion of the interface extension system located at the TV receiver location will now be described. As shown in FIG. 1c, transmitted signals arriving over the air at antenna 15 or local cable 61 (optionally through set top box 76) are received at transceiver 14. In addition, the output of an optional video camera 19 can be coupled to transceiver 14 for transmission to PC 2 through PC interface unit 10 (FIG. 1a). Transceiver 14 receives the transmitted PC audio and video signals and couples them to TV receiver 4 as composite video 16, audio left and right channel information 18, or as a radio frequency signal 25.

As shown in FIG. 1c, a input interface extender 26 is connected to input devices including joystick 27c, keyboard 27a, mouse 27b, microphone 27d, and telephone 27e. Input interface extender 26 is also coupled to an available backchannel 21, illustrated representatively as the AC wiring system accessed through power outlet 23.

In this exemplary embodiment of the invention, input interface extender 26 includes a USB hub 64 used to control the communication of data generated by input devices 27a through 27e, through a USB standard transmission protocol. A modem 22 used for transmitting and receiving signals via wireless single sideband radio frequency or via carrier current on conductors is also included within input interface extender 26.

As described in the foregoing, there is no requirement that the backchannel 21 be implemented as a transmission line, such as via the AC wiring system of a house. For example, signals can be transmitted via electromagnetic radiation (e.g. radio frequency, microwave frequency or infrared radiation) from the location of the TV receiver to the PC without requiring the use of a transmission line between the two locations. As further shown in FIG. 1c, input interface extender 26 includes circuitry 66 for receiving input data from "LEGACY", i.e. non-USB, input devices 27a through 27e and converting that input data to a format suitable for transmission according to USB transmission protocol. Further circuitry 68 is used to attach standard USB identifiers to the converted signals for transmission on USB bus 65.

As also shown in FIG. 1c, input interface extender 26 may include one or more function buttons 70 for automatically activating functions which vary the operation of the PC as well as the operation of other parts of the interface extension system. Function buttons 70 can operate hardwired functions within input interface extender 26, or "launch" single or multiple instruction programs to be accessed and executed on input interface extender 26 or to be transmitted via backchannel 21 through PC interface unit 10 to PC 2 to be executed thereon.

A programming instruction language known as Java® has been developed which is designed to operate independently of the processor implementation (i.e. the "microprocessor" element of a PC) or the operating system (e.g. DOS, OS/2®, or Apple®) which resides on the PC. In the exemplary embodiment of the invention described herein, such multiple instruction programs, called "Micro applications" reside at the input interface extender 26 and may be launched therefrom to the PC interface unit 10 at the touch of a function button 70 or other simple input from any one of the various input devices 27a through 27e. Finally, input interface extender 26 includes an 8-bit, 16-bit, or 32-bit microcontroller 74 which controls its operations, including the flow of USB data traffic to and from input interface extender 26.

Figure 2:
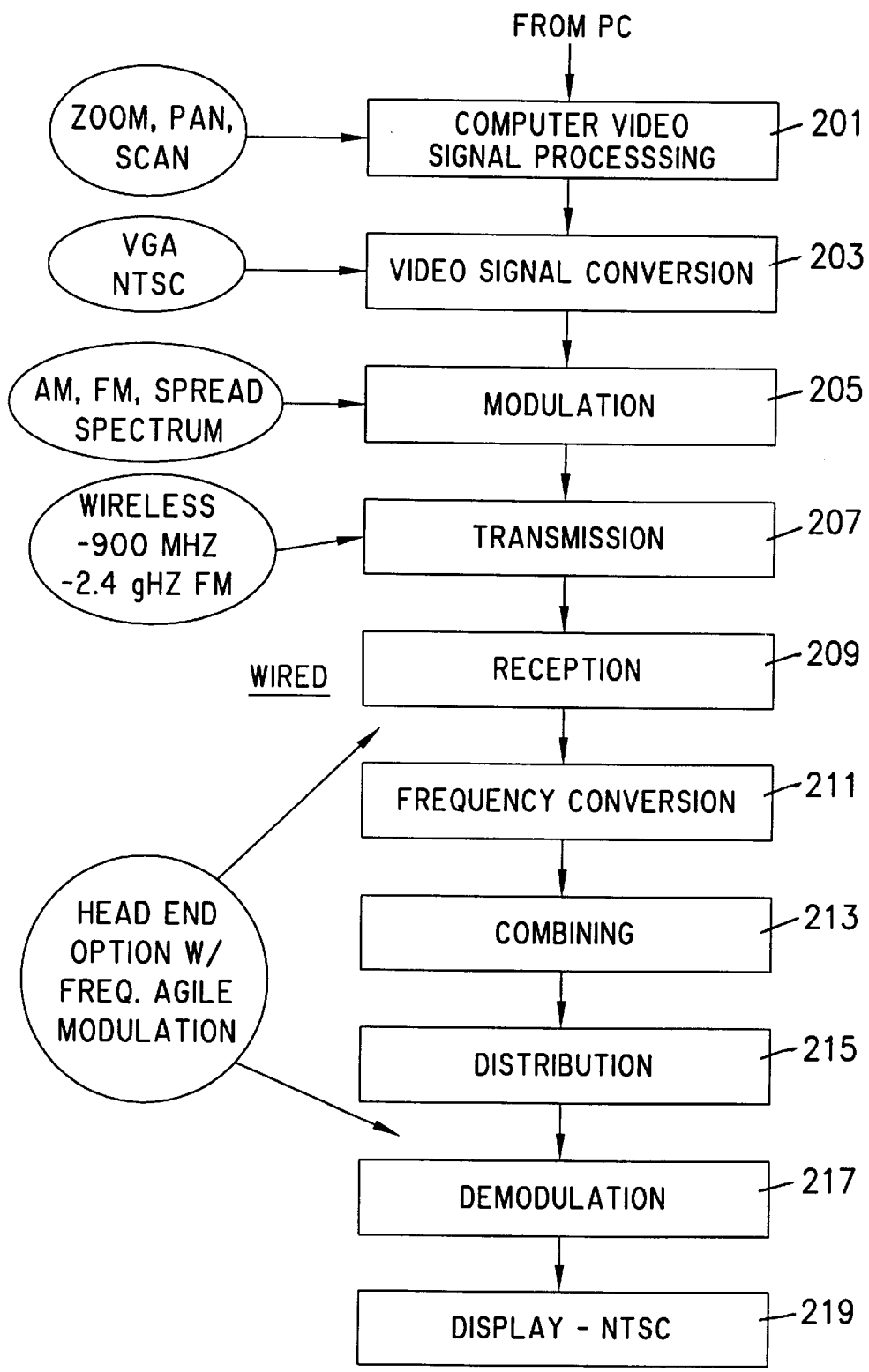
FIG. 2 is a flowchart illustrating video signal processing operations performed by the invention.

FIG. 2 is a flow chart illustrating the video signal processing operations performed in a representative embodiment of the present invention. As shown in FIG. 2, video signals received from PC 2 are first digitally (i.e. "computer") processed to provide selected viewing conditions, e.g. zoom, pan, or scan which may be default selected or selected by the user through input provided at input interface extender 26. The processed video is then converted (in step 203) from a PC scan format (e.g. VGA) to a television format (e.g. NTSC). The converted video signal is then modulated (step 205) via a suitable method, e.g. amplitude modulation, frequency modulation, or spread spectrum, and then transmitted (step 207) at a radio frequency (e.g. 900 MHz) or microwave frequency (e.g. 2.4 GHz) over the air from the PC location via transceiver 12.

At the head end location of the local cable system, (such as the garage of as in a house) the transmitted video signal is received (step 209) and converted (step 211) to a frequency identified by a frequency agile modulator 58 as being available. The converted frequency signals are then combined, in step 213, and distributed in step 215 through one or more local cables 61 to TV receivers 4. The distributed cable signals are then received at transceivers 14 located at respective TV receivers 4, demodulated thereat (step 217), and provided to respective TV receivers 4 for display in a television scan format such as NTSC (step 219).

The operations of the interface extension system will now be described with reference to FIGS. 1, and 1a through 1c. When a user located within viewing distance of TV receiver 4 at a location (e.g. living room) remote from a PC 2 desires to use the PC 2 at the TV receiver 4, the user may activate a function button located on input interface extender 26 at the user's viewing location, which button launches, i.e., transmits, programming instruction 72 through transmitter 22 along backchannel 21 (shown representatively as the AC wiring) to AC power outlet 23 located in the vicinity of PC 2. The signal is received from outlet 23 through receiver 42 at the input to PC interface unit 10. Within PC interface unit 10 the instruction or multiple instruction program is received and processed by microcontroller 34 to provide a signal to PC 2 or to activate a switch which restores PC 2 to active operation from a sleep mode or powered off condition.

An additional instruction or multiple instruction program 72 may also be launched through a function button 70 to PC interface unit 10 and transmitted to PC 2 through USB or other input interface lines through coplexor 36. Such programming instructions can then be used to modify the display format of the video signal generated by PC 2 to permit improved viewing upon TV receiver 4.

While operating, PC 2 provides video signal output as VGA output to processor 32 or directly to transceiver 12 as a composite television scan format signal (e.g. NTSC). PC 2 also provides left and right audio channel data on "Audio" signal lines to processor 32. The video and audio signals are distributed by processor 32 to PC display screen 2a and PC speakers (not shown). Processor 32 provides control over the displayed video signal through zoom, pan, and scan inputs received through backchannel 21 from input interface extender 26.

After processing, the video signal is converted from the scan format (e.g. VGA) used by the PC to a scan format (e.g. NTSC) which can be viewed upon a television. The converted PC display signal at the output of scan converter 40, or the composite (NTSC) television format signal output directly from the PC 2 and the left and right audio signals are modulated for transmission by transceiver 12, transmitted through antenna 11 and then received at antenna 15 coupled to transceiver 14 at the location of TV receiver 4.

Alternatively, the transmitted signal from antenna 11 is received at antenna 52 at the input to head end unit 50 located at the head end of the local (e.g. household) cable system. The transmitted PC video display signal and any accompanying audio signals are received through antenna 52 and receiver 54, then modulated onto an available cable channel frequency by FAM 58 and provided to combiner 60 which combines the transmitted PC video display signal and any audio signals with the existing channel signals on the incoming cable 62 from the cable service provider and provides the combined output on one or more cables 61 which distribute the cable signals locally, such as within a house.

At the television receiver 4, signals received from the PC through antenna 15 or cable 61 through set top box 76 are provided as baseband video signal 16 and audio left and right channel signals 18 to TV receiver 4. Alternatively, transceiver 14 outputs radio frequency signals on one or more cables 25 which provide the PC video display signal and one or more audio channel signals to be displayed on the TV receiver 4 or output on one or more loudspeakers 20 incorporated into TV receiver 4 or coupled thereto.

Viewing the PC generated video signal and listening to accompanying audio signals, if any, which are output on TV receiver 4, the user located at a viewing position near TV receiver 4 is able to operate any one of a plurality of available PC input devices shown representatively as keyboard 27a, mouse or pointing device 27b, joystick 27c, microphone 27d, or digital telephone 27e, to vary the video display and/or audio signal information.

Using such input devices, the user provides input controlling the operations of the PC through input data transmitted to the PC via USB converter 68 and USB hub 64 onto backchannel 21 through modem 22. It will be appreciated by those skilled in the art that a full range of input methods are available to the user at the TV receiver location to permit the user to exercise full control over the PC 2, including control over the operations of the PC hardware, its operating system, and any applications which are executed thereon.

Input data transmitted from the input interface extender 26 is received at PC interface unit 10 through modem 42 and provided as inputs to coplexor 36 and multiplexor 38. When PC 2 has a USB input port, USB input can be provided as multiplexed input data on the USB interface line shown through USB bus 30 from USB compatible devices located at PC 2 and from devices 27a through 27e at the TV receiver location through USB hub 64.

When either the PC 2 or PC location input devices 29a through 29d are not USB compatible, coplexor 36 is used to individually receive input from various input devices 29a through 29d and individually multiplex data from each type of input device e.g. data from keyboard 29a, with data from the corresponding input device keyboard 27a, which is located at the TV receiver 4. These "coplexed" outputs are transmitted from PC interface unit 10 to PC 2 on traditional dedicated input interfaces, which are shown representatively as "Mouse", "Keyboard", "Joystick", "Serial", and "Mic".

Using the present invention, a user located at TV receiver 4 has full control over the operations of PC 2, although PC 2 is located remotely, i.e. beyond the normal reach of standard input interface lines. As a further example of operations, a user located at TV receiver 4 can command the PC 2 to execute a video conferencing application which then provides video signals generated by the PC from data received over a network (e.g. the Internet, or public switched telephone network) and provides related audio output to the user over speaker 20 or through telephone 27e. As a return signal for the video conference, the user may speak through telephone 27e and locally generate video signals by video camera 19 for transmission to other participants of the video conference.

Figure 3B:
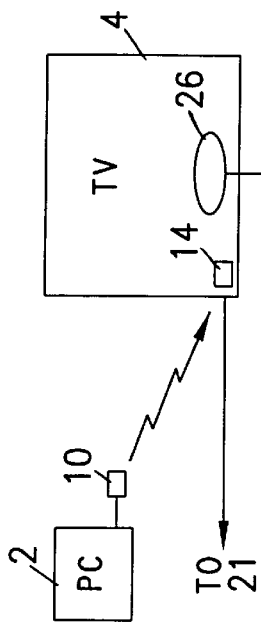
FIG. 3b illustrates the placement and interconnection of system components with respect to a TV receiver in a system constructed according to another embodiment of the invention.
Figure 3D:
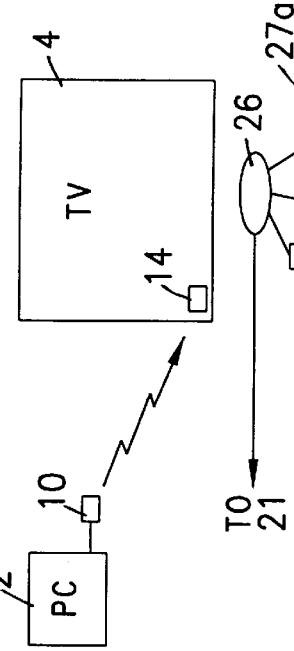
FIG. 3d illustrates the placement and interconnection of system components with respect to a TV in a system constructed according to yet another embodiment of the invention.
Figure 3A:
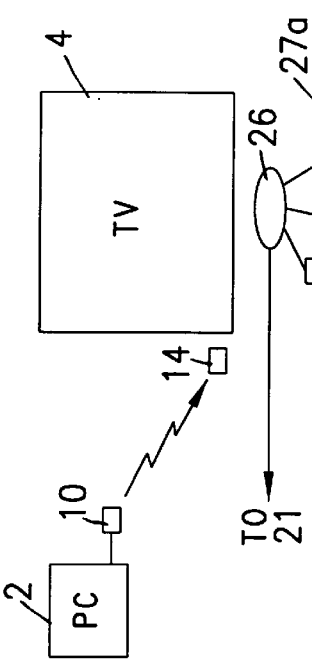
FIG. 3a illustrates the placement of system components with respect to a TV receiver in a system constructed according to the first embodiment of the invention.

FIGS. 3a through 3d illustrate various physical configurations in which the interface extension system of the present invention may be embodied. FIG. 3a shows a physical implementation which is the same as that shown in FIG. 1c, wherein transceiver 14 and input interface extender 26 are located externally to the TV receiver 4.

FIG. 3b shows another embodiment in which transceiver 14 and input interface extender 26 are built in to TV receiver 4. In this embodiment, a keyboard 27a may have either a wired or a wireless (e.g. infrared) connection with the input interface extender 26.

Figure 3C:
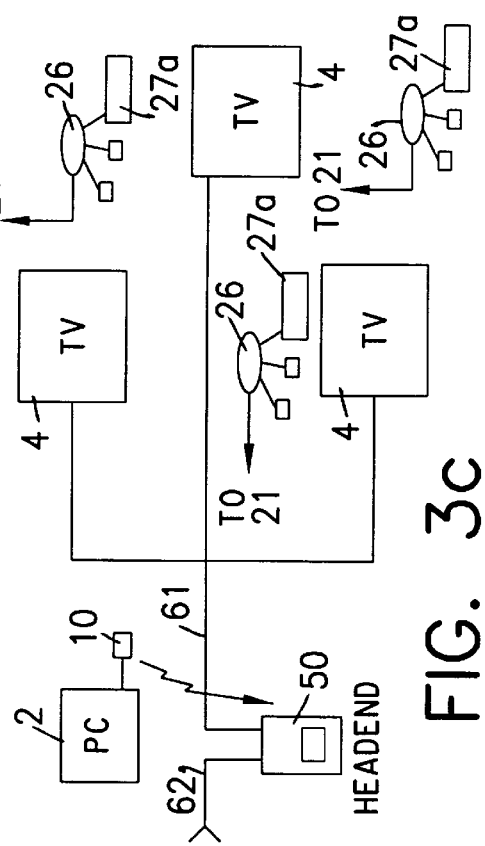
FIG. 3c illustrates the placement and interconnection of system components with respect to a plurality of TV receivers in a system constructed according to yet another embodiment of the invention.

FIG. 3c shows an embodiment of the invention in which PC signals are distributed to a plurality of TV receivers 4, each of which has an input interface extender 26 which transmits input data from devices (e.g. keyboards 27a) along backchannel 21 through PC interface unit 10 to PC 2. In this embodiment, the PC video display signal, and left and right audio channel signals are transmitted via radio frequency or microwave frequency signals from PC interface unit 10 to head end unit 50 located at a head end of a incoming cable 62 from a CATV provider. Signals received from PC through PC interface unit 10 are combined with the incoming CATV signals on cable 62 and distributed to multiple TV receivers through a plurality of cables 61 to RF input ports thereof.

In this distributed transmission system embodiment of the present invention, video signals generated by PC 2 may be transmitted to users at each of the TV receivers 4, which video signals appear the same to all such users. However, such multiple location distribution is advantageously utilized in a system in which users located at each of the TV receivers 4 provide input data which are recognized by PC 2 as being generated at different respective input interface extenders 26 at the locations of the respective TV receivers 4. Such system is utilized to execute game applications, for example, for which more than one player provides control inputs for controlling the execution of such game applications. Thus, by this distributed system embodiment of the invention, users located in different rooms at which a TV receiver 4 or other display monitor is located, can interactively control the operation of a single PC 2.

The USB standard transmission protocol provides for the affixing of USB identifiers to serial data which is generated by various input devices, e.g. keyboard 27a. Therefore, input interface extenders 26 having such circuitry 68, which are located at respective video display devices, e.g. TV receivers 4, are capable of adequately tagging the data from input devices located at respective input interface extenders 26 so as to permit PC 2 to recognize the location from which such input data has been received and to control the operations of PC 2 in accordance therewith.

As a further extension of the distributed system embodiment of the invention, PC interface unit 10 can incorporate an adapter within processor 32, which adapter is used to generate multiple screen video displays from virtual video display information which is provided by PC 2 over the "VGA" output line therefrom. Multiple screen video adapters, such as those which are sold currently by Colorgraphic Corp., generate multiple screen video signals from a standard VGA video output display signal from a windowed, i.e. Graphical User Interface (GUI) display. Thus, the display screen data viewed by users at respective TV receivers 4 can be different for each user. In conjunction with providing such multiple screen video displays, PC interface unit 10 can incorporate additional soundcard circuitry within processor 32 for providing coordinated audio signals for output on loudspeakers located at respective video display devices, e.g. TV receivers 4. Alternatively, PC 2 can be reconfigured by the user with additional audio processing circuitry such as one or more soundcards, providing multiple monoaural or paired stereophonic audio signals from each soundcard, such that a single soundcard may be used to process audio signals for output to more or more user sessions provided at respective TV receivers 4.

In addition, operating systems such as OS/2® and Windows® provide for multi-tasking servicing of different applications on a single PC through a single common GUI. In the distributed embodiment of the present invention, the PC user interface can be said to be "multiplied", such that each user is capable of exercising control over the operations of PC 2 in an independently controlled interactive session.

FIG. 3d shows another embodiment of the invention in which the transceiver 14 is incorporated into the TV receiver 4, but input interface extender 26 is used as an auxiliary unit which is not built into the TV receiver 4.

Figure 4:
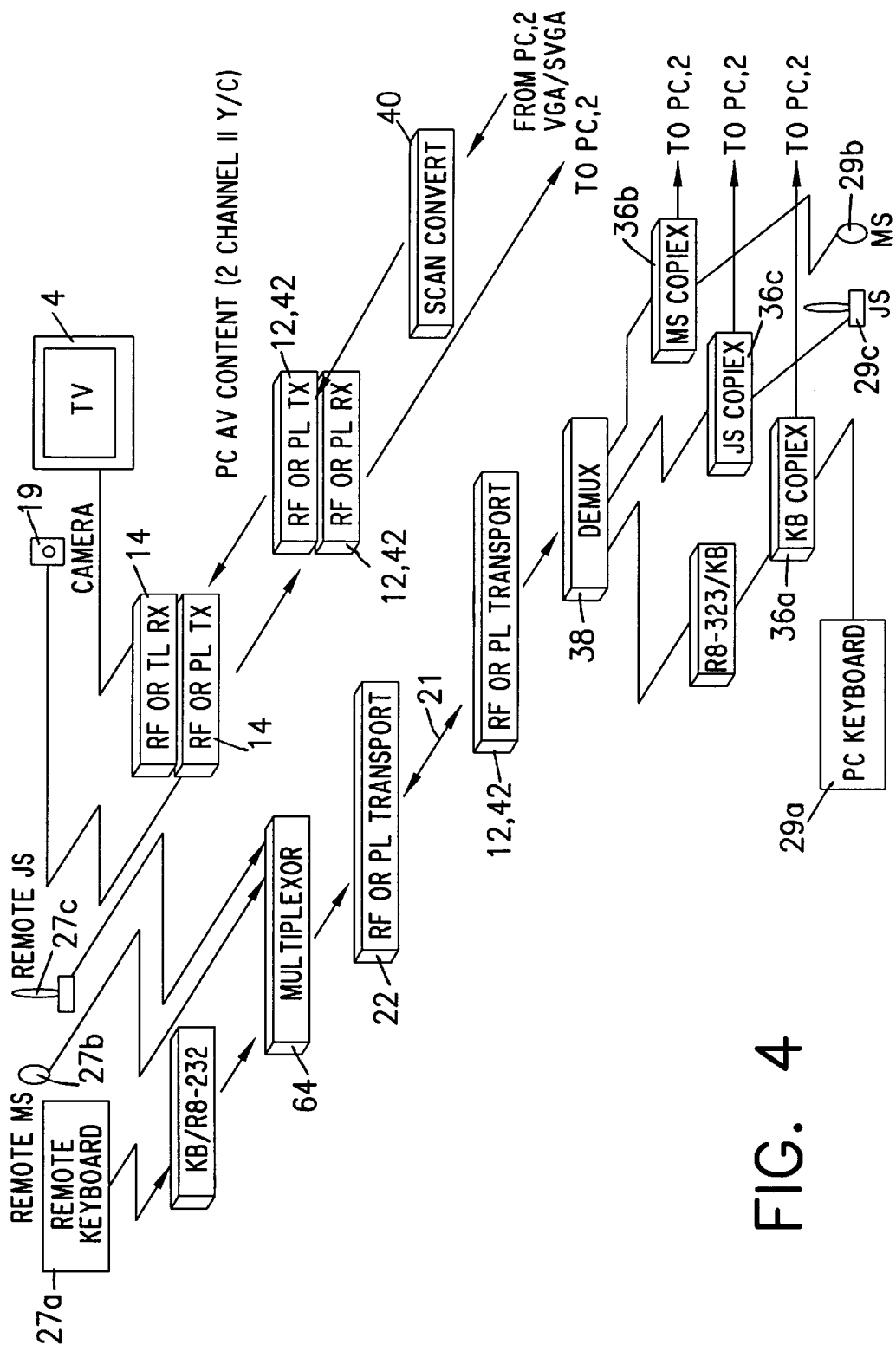
FIG. 4 is a block and schematic diagram illustrating the construction and operations of the input interface extender and video signal conversion and transmission portions of the present invention.

FIG. 4 illustrates the flow of signals to and from PC 2 to TV receiver 4, video camera 19 and representative input devices including keyboards 27a, 29a joysticks, 27c and 29c, and mice 27b and 29b. As shown in FIG. 4, video signals generated by PC 2 are converted from a VGA/SVGA scan format by converter 40 and transmitted with accompanying audio signals, if any, via radio frequency or microwave frequency via transceiver 12 or via power line (PL) modem 42 to a transceiver 14 located at the TV receiver. Those skilled in the art will understand that the video signal may be transmitted as a single composite video signal which includes chrominance and luminance content or as two separately modulated chrominance and luminance signals (denoted Y/C) for improved image quality. In such case, transceivers 12 and 14 will be constructed to transmit and receive chrominance and luminance signals on two channels. As shown in FIG. 4 video signals generated by camera 19 are transmitted via transceiver 14 via radio frequency, microwave frequency or power line transmission to transceiver 12 or modem 42 located in PC interface unit 10. The video signal received at PC interface unit 10 is then provided as input information to PC 2.

As further shown in FIG. 4, data from input devices located at a viewing location the TV receiver 4, including keyboard 27a, pointing device, i.e. mouse 27b, and joystick 27c are multiplexed through multiplexor 64 which may be, for example, a USB hub, and are transmitted via modem 22 via radio frequency, microwave frequency or power line transmission on backchannel 21. At the PC interface unit 10 the multiplexed input data is received from backchannel 21 through modem 42. As further shown in FIG. 4, when PC 2 does not contain a USB interface, or when input devices located at PC 2 including PC keyboard 29a, mouse or pointing device 29b, and joystick 29c are not USB compatible, the data from each such input device located at the TV and each corresponding input device located at the PC 2 must be "coplexed" for input to PC 2. This operation is shown as the demultiplexing of the transmitted input data by DEMUX 38 at the inputs to coplexor circuits 36a, 36b, and 36c used to coplex keyboard, pointing device and joystick data, respectively for input to PC 2.

In still another embodiment of the invention, a system is provided wherein a television signal can be viewed upon TV receiver 4 in conjunction with a video signal generated by PC 2, together with accompanying audio signals, when present, from data related to the television transmission. As shown in FIG. 1c a set top box 76 is coupled to the local cable 61 and provides output as one or more cable channel signals to transceiver 14. Alternatively, set top box 76 may be connected only to the local cable 61 and have an output connection to TV receiver 4.

Set top box 76 includes digital signal processing circuitry for extracting a "Universal Resource Locator" address which is transmitted during a blanking interval, e.g. the vertical blanking interval or a horizontal blanking interval of a television transmission. The extracted URL address is provided on a signal line 78 to input interface extender 26 which modulates the URL signal via modem 22 for transmission via radio frequency, microwave frequency or power line transmission on a backchannel 21 to PC 2 through PC interface unit 10.

PC unit 10 uses the URL address to access data related to the television transmission and, after such access is obtained, provides the accessed data as video, audio, or other information signal via transceiver 12 or modem 42 to the transceiver 14 and/or input interface extender 26. Data in the form of video signals are provided to TV receiver 4 through transceiver 14. The related PC data signal is then available for viewing by the user as a picture-in-picture format signal on a TV receiver which has such capability, or alternatively, can be viewed selectively in conjunction with the television transmission at the touch of a button on a TV receiver control device or input interface extender 26. Input interface extender 26 may also provide rapid and direct switching between the standard television transmission and the related PC generated signal.

Although the invention has been described herein with reference to particular preferred embodiments, it is to be understood that these embodiments are merely illustrative of the aspects and features of the invention. As such, it may be obvious to a person skilled in the art to make numerous modifications to the illustrative embodiments described herein. Such modifications and other arrangements which may be devised to implement the invention should not be deemed as departing from the spirit and scope of the invention as described and claimed herein.

What is claimed is:

1. A system for providing video displays generated by a computer to a computer monitor of a local user at said computer and to a remote user having a remotely located video monitor and for enabling said local and said remote user to control interactive independent sessions on said computer, said system comprising:

(a) a transmitter for transmitting signals representing at least portions of said video displays from said computer to the remotely located video monitor;

(b) an input interface extender at said remotely located video monitors for connection to remote user input devices, said input interface extender transmitting signals to the location of said computer; and (c) multiple session means at said location of said computer for receiving said transmitted signals and signals generated by said local user to permit said local user and said remote user to control said computer in independent interactive sessions and independently effect changes in the video displays on the respective monitors.

2. The system of claim 1 wherein each of said input interface extenders includes means for affixing an identifier to data received from user input devices connected thereto to permit said computer to distinguish between signals received from different input interface extenders.

3. The system of claim 1 wherein said remotely located video monitor is a TV, and said system further comprises a scan converter for converting signals representing said video displays from a scan format utilized by said computer to a scan format utilized by said TV to permit at least portions of said video displays to appear on said TV.

4. The system of claim 1 wherein the video displays include corresponding audio accompaniments.

5. A system for enabling a video display generated by a computer to be viewed on a video monitor at a remote location from said computer and for controlling said computer from said remote location with remote user input devices, comprising:

(a) a transmitter for transmitting signals from said computer to said video monitor to permit at least a portion of said video display to be viewable on said video monitor;

(b) a receiver at said location of said video monitor for receiving signals transmitted by said transmitter for input to said video monitor;

(c) an input interface extender at said location of said video monitor receiving inputs from said remote user input devices, said input interface extender combining the inputs from said remote user input devices into a single multiplexed data stream and transmitting said multiplexed data stream to the location of said computer;

(d) a demultiplexing circuit at the location of said computer for receiving and separating said multiplexed data stream into individual data streams comprising data generated by one of said remote user input devices, at least one of said individual data streams being input to said computer to effect control thereof.

6. The system of claim 5 further comprising circuitry for receiving at least one of said individual data streams and a second data stream generated by a local user input device at said computer and providing a multiplexed output thereof to said computer to enable control thereof from said remote user input device and from the local user input device.

7. The system of claim 5 wherein said input interface extender transmits said multiplexed data over wire conductors to said computer.

8. The system of claim 5 wherein said input interface extender transmits said multiplexed data utilizing electromagnetic radiation.

9. The system of claim 5 wherein said transmitter transmits signals from said computer to a head-end location for distribution and coupling to said video monitor.

10. The system of claim 5 wherein the video information includes an audio accompaniment that is output by said video monitor.

11. The system of claim 5 further comprising a scan converter for converting signals representing said video display from a scan format utilized by said computer to a scan format utilized by said video monitor.

12. The system of claim 5 wherein said scan converter converts said signals prior to the transmission of said signals to said video monitor.

13. The system of claim 5 wherein said scan converter converts said signals after the transmission of said signals to said video monitor.

14. A system for enabling a video display generated by a computer to be viewed on a video monitor at a remote location from said computer and for controlling said computer with a remote user input device located at said remote location, comprising:

(a) a local transceiver at the location of said computer and a remote transceiver at said remote location, said local and remote transceivers transmitting information over a digital link;

(b) an input interface extender communicatively connected to said remote user input device at said remote location and for providing remote input signals generated by said remote user input device to said remote transceiver; and (c) said local transceiver transmitting digital signals from said computer to said remote transceiver for input to said video monitor to enable at least portions of said video display to be viewed on said video monitor and said remote transceiver transmitting digital remote input signals generated by said remote user input device to said local transceiver to effect control of said computer.

15. The system of claim 14 wherein said information transmitted and received by said first and second transceivers is in the form of spread spectrum signals.

16. A method of controlling a computer from a remote location by using one or more remote computer input devices at said remote location and enabling at least portions of a video display generated by said computer to be viewed on a video monitor at said remote location, comprising the steps of:

(a) generating control signals from said one or more remote computer input devices;

(b) combining said control signals into a single multiplexed data stream;

(c) transmitting said multiplexed data stream to the location of the computer;

(d) separating said multiplexed data stream into individual data streams, each of said individual data streams comprising data generated by one of said remote computer peripheral devices;

(e) providing at least one of said individual streams to said personal computer to effect control thereof, said computer generating a display signal representing at least portions of the video display; and (f) transmitting and interfacing said display signal to said video monitor to enable at least portions of said video display to be viewed on said video monitor.

17. The method of claim 16, wherein the video display includes audio accompaniment and the display signal generated by the computer includes a corresponding audio signal which is transmitted to the video monitor to be output therefrom.

18. The method of claim 16, wherein the transmission of said display signal is via a wireless communications link.

19. The method of claim 16, wherein the transmission of said multiplexed data stream is via a wireless communications link.

20. The method of claim 16, wherein the transmission of the display signal and said multiplexed data stream are over the same wireless communication link.

21. The method of claim 16, further comprising the step of scan converting said display signal generated by said computer before transmitting said display signal to said video monitor.

22. The method of claim 16, further comprising the step of scan converting said display signal generated by said computer after transmitting said display signal to said video monitor.

* * * * *